Sept. 27, 1949. H. A. SCHMITZ, JR 2,483,156
JOINT SEAL FOR PRESSURE VESSELS OR THE LIKE
Filed May 11, 1946
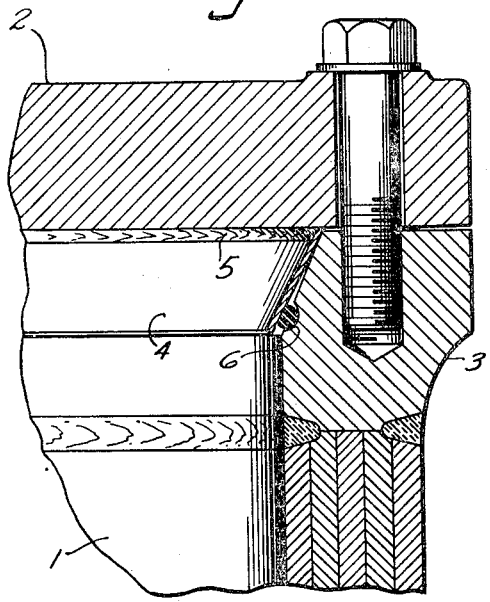
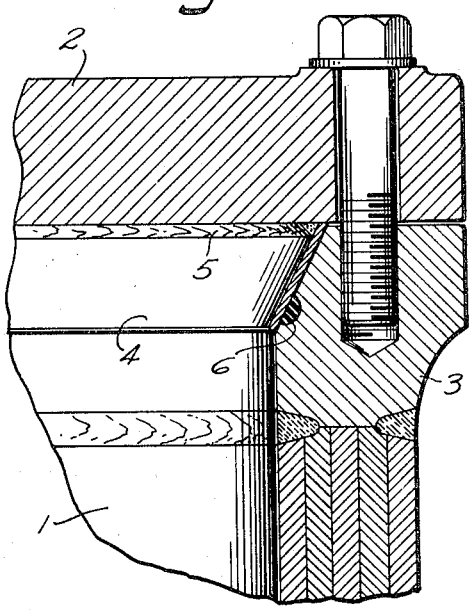
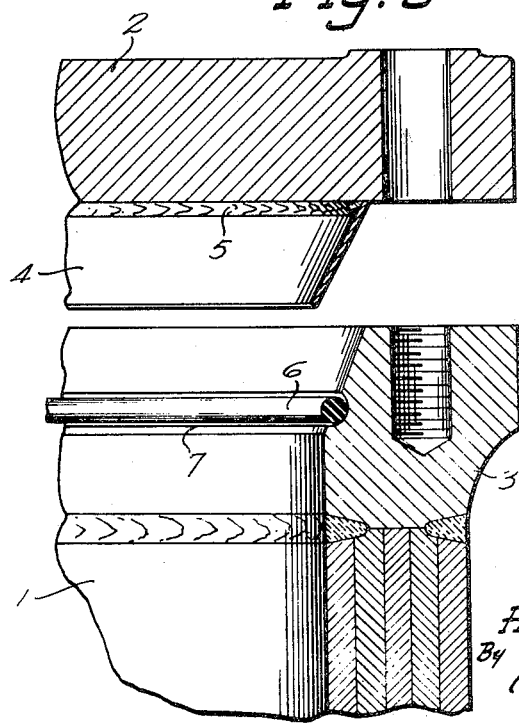
Inventor
Henry A. Schmitz Jr.
By
Attorney Patented Sept. 27, 1949

2,483,156

UNITED STATES PATENT OFFICE 2,483,156

JOINT SEAL FOR PRESSURE VESSELS OR THE LIKE

Henry A. Schmitz, Jr., Shorewood, Wis., assignor to A. O. Smith Corporation, Milwaukee, Wis., a corporation of New York Application May 11, 1946, Serial No. 669,173

3 Claims. (Cl. 220—46)

This invention relates to a joint seal for a pressure vessel or like structure which is under a substantial pressure in service.

The principal object of the invention is to provide a joint seal for a pressure vessel that is less costly and readily assembled with the vessel.

Other objects of the invention will appear hereinafter in connection with the following description of an embodiment of the invention illustrated in the accompanying drawings.

In the drawings:

Figure 1 is a longitudinal sectional view of a portion of a pressure vessel showing the joint of the invention but without any pressure inside the vessel;

Fig. 2 is a view similar to Figure 1 with the vessel under pressure; and

Fig. 3 is a view similar to Fig. 2 with the parts disposed ready for assembly.

The joint that is sealed by the invention is illustrated as employed with the pressure vessel 1 between the head 2 and the end ring 3 thereof which are bolted or otherwise secured together to confine the contents of the vessel under a predetermined pressure. The inside surface of end ring 3 is tapered complementary to the seal ring 4 with the greatest inner diameter of ring 3 disposed adjacent head 2 and corresponding to the greatest diameter of seal ring 4.

The seal for the joint described comprises the generally thin conical shaped seal ring 4 that is joined to the inner surface of head 2 by the circumferential weld 5 and which lies within the end ring 3. The inner freely floating portion of the seal ring engages the annular gasket 6 and compresses the same within the circumferential groove 7 of the end ring 3. The seal ring 4 expands under pressure against gasket 6 to seal the end joint of the vessel.

The gasket 6 is of any suitable compressible and corrosion resistant material and is slightly larger than groove 7 to insure that the joint between seal ring 4 and end ring 2 will be completely sealed against passage of the contents of the vessel when ring 4 moves radially outwardly under pressure from the contents of the vessel to compress the gasket within groove 7.

The gasket 6 is preferably located only slightly removed from the inner free end of seal ring 4 where the tension on ring 4 from pressures within vessel 1 will have the greatest effect.

The seal ring 4 is of substantially thin metal so that it will readily react to the tension under which it is placed by pressure from the contents of the vessel to move radially outwardly and compress gasket 6 to seal the end joint of the vessel.

The seal is readily assembled within the vessel. After seal ring 4 is suitably fabricated from thin metal to the shape illustrated in the drawings, the outer end thereof is joined to the inner surface of head 2 by the circumferential weld 5 which may be accomplished by electric arc welding.

The annular gasket 6 is then disposed within groove 7 and head 2 is assembled within the end ring 3 of vessel 1 with the free inner end seal ring 4 riding over the gasket 6. Head 2 is then bolted or otherwise secured to end ring 3 to close the end of the vessel.

The vessel 1 is then filled with the liquid or fluid which is to be contained therein under a predetermined pressure.

The pressure of the contained fluid places seal ring 4 under tension and the thin ring 4 being only secured at the outer end, moves or flexes radially outwardly. The gasket 6 is compressed by ring 4 within groove 7 and changes from the generally round shape of Figure 3 to the generally elliptical shape of Fig. 2 to seal the vessel joint and prevent passage of contained fluid through the joint between ring 4 and end ring 3 and between the latter and head 2.

The invention provides an inexpensive sealed joint for a pressure vessel or the like that has few parts and which is readily assembled.

Various embodiments of the invention may be employed within the scope of the accompanying claims.

I claim:

1. A seal for the joint between the generally thick head and end portion of a pressure vessel or the like adapted to withstand substantially high internal pressures, which comprises a substantially thin ring having the outer end thereof secured to said head and the inner end portion freely floating within the end portion of said vessel and disposed to be forced outwardly by the generally high internal fluid pressures to which the vessel is subjected, and an annular gasket disposed between the end portion of the vessel and the freely floating portion of the ring and compressed by said ring, said ring being held against said gasket by internal fluid pressure in said vessel to seal the joint.

2. A seal for the joint between the generally thick head and end portion of a pressure vessel or the like having the inner surface of the end portion outwardly tapered adjacent the end of the vessel, which comprises a substantially thin conically shaped ring having the outer end of largest diameter secured to the inner surface of said head and the inner end portion freely floating within the end portion of the vessel and disposed complementary to and adjacent the tapered surface of said end portion to be forced outwardly thereagainst by the internal pressures to which the vessel is subjected, and an annular gasket secured between the tapered surface of said end portion and the freely floating portion of the ring and compressed by said ring to seal the joint between the head and vessel end portion against the passage of the contents of the vessel therebetween.

3. A seal for the joint between the head and end ring of a high pressure vessel or the like having the inner surface of said end ring outwardly tapered, which comprises a substantially thin conically shaped seal ring having the outer end of largest diameter welded to the inner surface of said head and the inner portion freely floating within said end ring and disposed complementary to and adjacent the tapered surface thereof to be forced thereagainst by the high internal fluid pressure of the vessel contents, and an annular gasket supported in a circumferential groove in the end ring in the joint between the freely floating portion of the seal ring and end ring, said gasket being compressed by said seal ring to seal the joint between the head and end ring against the passage of the contents of the vessel therebetween.

HENRY A. SCHMITZ, JR.

REFERENCES CITED

The following references are of record in the file of this patent:

UNITED STATES PATENTS

| Number | Name | Date |
| --- | --- | --- |
| 2,130,651 | Phillips | Sept. 20, 1938 |
| 2,201,482 | Driggs, Jr. | May 21, 1940 |
| 2,218,188 | Wittenberg | Oct. 15, 1940 |

FOREIGN PATENTS

| Number | Country | Date |
| --- | --- | --- |
| 464,534 | Great Britain | Apr. 20, 1937 |